(12) United States Patent
Marques et al.

(10) Patent No.: US 10,576,853 B2
(45) Date of Patent: Mar. 3, 2020

(54) METHOD OF MANUFACTURING A SEAT BACK CUSHION ASSEMBLY

(71) Applicant: LEAR CORPORATION, Southfield, MI (US)

(72) Inventors: Jose Marques, Vaux sus Seine (FR); Nathalie Navarro, Viroflay (FR)

(73) Assignee: LEAR CORPORATION, Southfield, MI (US)

( * ) Notice: Subject to any disclaimer, the term of this patent is extended or adjusted under 35 U.S.C. 154(b) by 227 days.

(21) Appl. No.: 15/599,008

(22) Filed: May 18, 2017

(65) Prior Publication Data
US 2018/0334064 A1    Nov. 22, 2018

(51) Int. Cl.
*B60N 2/58*    (2006.01)

(52) U.S. Cl.
CPC ................... *B60N 2/5891* (2013.01)

(58) Field of Classification Search
CPC ...... B60N 2/5891; B60N 2/58; B60N 2/7017; B60N 2/5883; Y10T 29/481
See application file for complete search history.

(56) References Cited

U.S. PATENT DOCUMENTS

| | | | | |
|---|---|---|---|---|
| 2,274,929 A | * | 3/1942 | Millar | B68G 7/04 156/383 |
| 3,222,697 A | * | 12/1965 | Scheermesser | A47C 27/144 297/452.48 |
| 3,270,394 A | * | 9/1966 | Marsh | A47C 27/22 156/212 |
| 3,519,308 A | * | 7/1970 | Kasman | B60N 2/60 297/452.58 |
| 4,040,881 A | * | 8/1977 | Wallace | B32B 7/08 156/93 |
| 4,663,211 A | * | 5/1987 | Kon | B29C 44/5636 297/452.61 |
| 4,711,495 A | * | 12/1987 | Magder | A47C 4/028 297/452.52 |
| 4,754,720 A | * | 7/1988 | Dietrich | D05B 23/00 112/132 |
| 5,193,474 A | * | 3/1993 | Urai | D05B 35/08 112/163 |
| 5,359,950 A | * | 11/1994 | Schellas | A41D 27/24 112/160 |
| 5,388,891 A | * | 2/1995 | Oka | A47C 7/24 297/452.27 |

(Continued)

FOREIGN PATENT DOCUMENTS

| DE | 102010035845 A1 | 3/2012 |
|---|---|---|
| EP | 2611653 A1 | 7/2013 |

(Continued)

*Primary Examiner* — James M Ference
(74) *Attorney, Agent, or Firm* — Brooks Kushman P.C.

(57) ABSTRACT

A method for manufacturing a vehicle seat cushion assembly includes providing an outer material to define an outer seating surface. A backing material is sewn to the outer material using a first sewing line against which a wadding material is placed in a central region of the cushion. To secure the wadding material, a second sewing line is run. Left and right wadding materials are placed between the sewing lines and the edges of the cushion. Additional sewing lines laterally cross the longitudinal sewing lines to imbue the cushion with a wrist watch-like appearance.

12 Claims, 4 Drawing Sheets

(56) References Cited

U.S. PATENT DOCUMENTS

| | | | | |
|---|---|---|---|---|
| 5,501,165 | A * | 3/1996 | Nagashima | B60N 2/5891 112/132 |
| 5,669,670 | A * | 9/1997 | Haraguchi | B29C 44/141 297/219.1 |
| 6,443,525 | B1 * | 9/2002 | Haupt | B60N 2/5833 297/452.59 |
| 6,886,479 | B1 * | 5/2005 | Hori | B60N 2/5883 112/470.27 |
| 7,448,643 | B2 * | 11/2008 | Kuettner | B60R 21/2342 280/728.3 |
| 7,823,980 | B2 * | 11/2010 | Niwa | B60N 2/5891 297/218.2 |
| 7,879,424 | B2 * | 2/2011 | Smith | B60R 13/0243 296/1.08 |
| 8,584,333 | B2 | 11/2013 | Marques et al. | |
| 8,967,712 | B2 * | 3/2015 | Yasuda | B60N 2/58 297/188.04 |
| 2004/0195227 | A1 * | 10/2004 | Park | H05B 3/34 219/217 |
| 2005/0081770 | A1 * | 4/2005 | Murley | B60N 2/58 112/475.06 |
| 2010/0038952 | A1 * | 2/2010 | Tsuji | B29C 44/1271 297/452.48 |
| 2011/0037243 | A1 * | 2/2011 | Laframboise | A47C 31/00 280/730.2 |
| 2011/0049949 | A1 * | 3/2011 | Basmaji | B60N 2/6036 297/219.1 |
| 2011/0278902 | A1 * | 11/2011 | Galbreath | B60N 2/70 297/452.48 |
| 2012/0001464 | A1 * | 1/2012 | Teoh | B60N 2/6018 297/218.1 |
| 2013/0140867 | A1 * | 6/2013 | Posnien | B60N 2/5883 297/452.1 |
| 2013/0187432 | A1 * | 7/2013 | Marques | B60N 2/70 297/452.58 |
| 2013/0320721 | A1 * | 12/2013 | Cortellazzi | B60N 2/6027 297/224 |
| 2014/0137610 | A1 * | 5/2014 | Chen | C14B 1/58 69/21 |
| 2016/0339819 | A1 * | 11/2016 | Shindo | B68G 7/05 |
| 2018/0334064 | A1 * | 11/2018 | Marques | B60N 2/5891 |
| 2018/0334066 | A1 * | 11/2018 | Marques | B60N 2/7017 |

FOREIGN PATENT DOCUMENTS

| | | |
|---|---|---|
| FR | 1456564 A | 7/1966 |
| GB | 2439922 A | 1/2008 |
| WO | 2012028218 A1 | 3/2012 |

* cited by examiner

METHOD OF MANUFACTURING A SEAT BACK CUSHION ASSEMBLY

TECHNICAL FIELD

This disclosure relates to a method of manufacturing a seat back cushion assembly and a cushion assembly made thereby.

BACKGROUND

Vehicle seat backs and related cushions are made from numerous materials. They are configured in various shapes and sizes to accommodate the specific requirements of a customer or vehicle in which they are deployed. One material installed in passenger and commercial vehicles is real or synthetic leather. Seat cushions may include a top surface of leather and an underlayment of a stiff backing material attached to the backside of the leather, with foam padding inserted between the top surface and the underlayment.

Although the stiff backing material may facilitate manufacturing and assembly processes, using such a material on a vehicle seat back has certain drawbacks. For example, the stiff backing material has different stretch characteristics from the leather upper material. This can lead to crease lines in the resulting seat back cushion surface.

One concern is that many seat backs use a thick seat trim cover panel made of multiple layers—e.g., an upper material, a foam wadding material, and a backing material. Such a seat back may not lie flat when attached to a seat frame. The process of attaching the backing material to the leather material with a foam padding interposed may result in a seat back cushion having a rear surface that undulates.

Another reason that a seat back cushion may be difficult to attach to a seat structure is that many cushions for example are manufactured with a generally rectangular perimeter. This facilitates the manufacturing processes by presenting material pieces that can readily be cut and assembled. For instance, if the entire seat cushion has a generally rectangular perimeter, the piece or pieces of foam padding can also have a generally rectangular shape. This makes it easier to insert the foam padding into pre-sewn pockets formed by the leather and the stiff backing material. Despite the ease of manufacturing, a rectangular shape may be suboptimal from a fit and finish perspective.

It would therefore be desirable to provide a method of manufacturing a seat back cushion and assembly that overcome some or all of these problems.

Among the art considered in preparing this patent application are U.S. Pat. Nos. 3,222,697; 4,754,720; 7,823,980; 8,584,333; 8,967,712; 2013/0140867; WO 2012/028218; DE 10 2010 035 845; EP 2 611 653; FR 1 456 564; and GB 2439922.

SUMMARY

Disclosed is a method for manufacturing a seat back cushion or seat cushion (collectively "seat back cushion") and an assembly thus manufactured. As a frame of reference, the seat back cushion can be considered to have longitudinally running side edges and laterally oriented top and bottom edges. The method includes these steps, not necessarily in the order presented:

providing an outer material to define a surface that faces a seat occupant;

sewing a backing material to the outer material (or vice-versa) using a first longitudinally oriented sewing line;

placing a wadding or padding foam or hacoflex material adjacent to the first longitudinally oriented sewing line;

sewing the backing material to the outer material (or vice-versa) using a second longitudinally oriented sewing line so that the wadding material is secured between the first and second sewing lines;

making a longitudinally running tiered or zig-zag sewing line between the first and second sewing lines from the top to the bottom edges (or vice-versa);

placing a wadding material between the outer and backing materials and between the first sewing line and an edge of the seat cushion and securing the wadding material by sewing a seam along a side edge;

placing a wadding material between the outer and backing materials and between the second sewing line and an opposite edge of the seat cushion and sewing a seam along the other side edge; and making a plurality of laterally oriented sewing lines between the side edges of the seat back cushion.

By practicing these steps and their variants, a wrist watch-like pattern is formed on the seat back.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
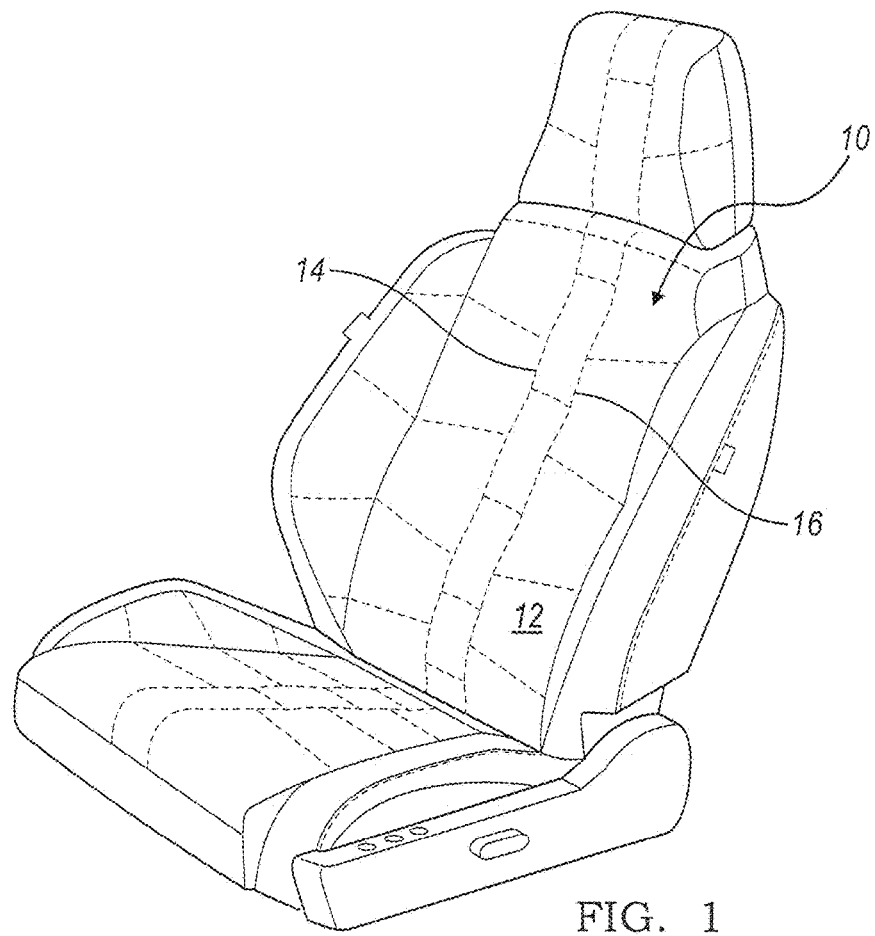
FIG. 1 shows a vehicle seat cushion assembly including a seat back cushion and a seat cushion in accordance with an embodiment of the present invention.

FIG. 1 shows a vehicle seat assembly 10 including a seat back cushion and a seat cushion in accordance with an embodiment of the invention. The disclosed method can be deployed in the making of a seat back cushion or a seat cushion or both. For simplicity this disclosure focuses on a method of making a seat back cushion. Thus it is to be understood that as used herein the term "seat back cushion" includes a seat back or a seat base or both a seat back and seat base by which a seat occupant may supported.

The vehicle seat assembly includes a seat back cushion 10 with an outer material 12, which may for example be leather that may be used as one or more layers, only some of which may be leather. The outer material 12 defines an outer seat back surface 13 (FIG. 1), which is a surface contacting an occupant of the seat.

The outer material 12 also includes an underside 15, which is not visible in FIG. 1. Disposed on the outer surface 13 of the cushion assembly 10 are first and second sewing lines 14, 16, which are preferably disposed generally longitudinally and approximately parallel to each other. The sewing lines 14, 16 secure the outer material 12 to a backing material 18 (FIGS. 2-5). Optionally, a hoop can be adhered or added to the elastic tulle. The hoop helps maintain and provide adhesion to a foam pad.

As used herein the term "backing material" includes for example a woven or non-woven or knitted or elastic tulle that may be light in weight and possess a stiffness characteristic for support.

For ease of reference, the seat back cushion can be considered as having two longitudinal edges, a top edge and a bottom edge. A "longitudinal" axis (A-A, FIG. 4) can be imagined as an axis of symmetry to turn generally in parallel with the side edges. A lateral axis (not expressly depicted) can be imagined to extend in parallel with the top and bottom edges orthogonally to the longitudinal axis (A-A).

Figure 2:
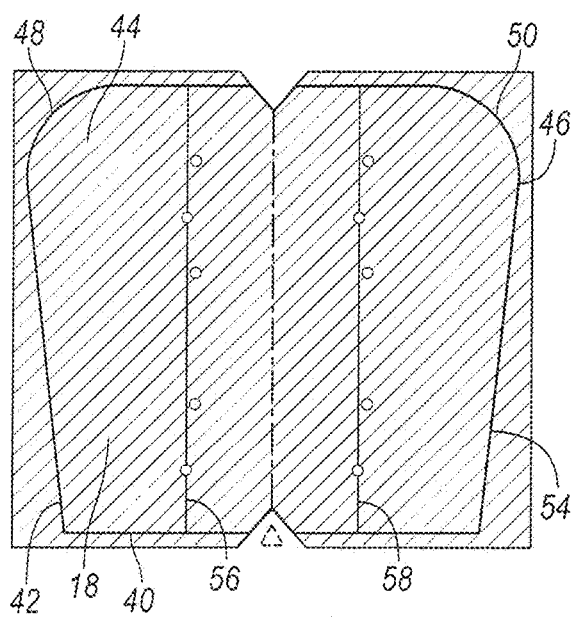
FIG. 2 shows an elastic backing material used with the seat back cushion shown in FIG. 1.
Figure 7:
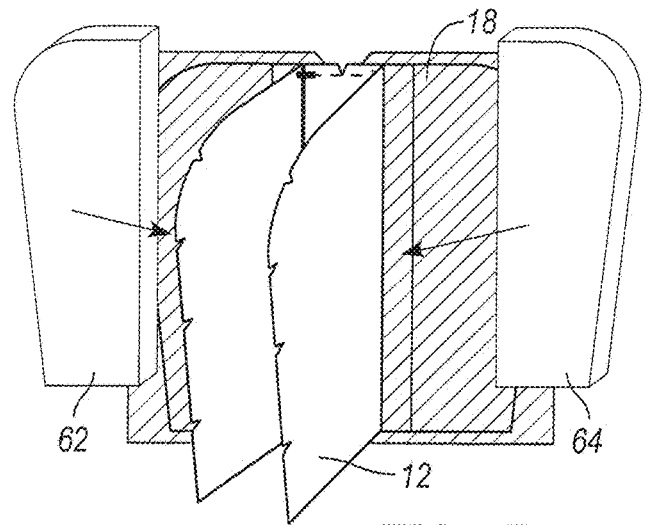

After being sewn in a manner to be described, sewing lines or seams 20-38 (FIGS. 3-14) attach the outer material 12 to the backing material 18 while securing a pad or wadding material 60 (FIGS. 4, 7 & 8) therebetween. An outer perimeter of the outer material 12 is generally defined by side edges and a top and bottom edge segments 40, 42, 44, 46 (FIG. 2). In addition, an outer perimeter of a seat back cushion 10 in accordance with embodiments of the present disclosure may have one or more curved segments, such as the segments 48-50 (FIG. 2). Other embodiments may have a curved perimeter with few or no linear segments.

FIG. 2 shows the backing material 18 in more detail. In particular, the backing material 18 has a perimeter that is generally coextensive with the perimeter of the outer material 12, and is also generally defined by corresponding linear edge segments. In at least some embodiments, the backing material 18 has a stretchability that is greater than the stretchability of the outer material 12. This helps to overcome problems associated with seat cushion assemblies having a stiff backing material, which tends to pull on the side or bolster cushions of the seat assembly when an occupant is seated. Thus, in embodiments having the lower stiffness backing material, such as the material 18, the backing material deforms at least as much or more than the outer material 12. This tends to produce to a better fit and greater comfort for the vehicle occupant. The material 18 may be, for example, a woven tulle or knit tulle or other similarly elastic material.

Figure 4:
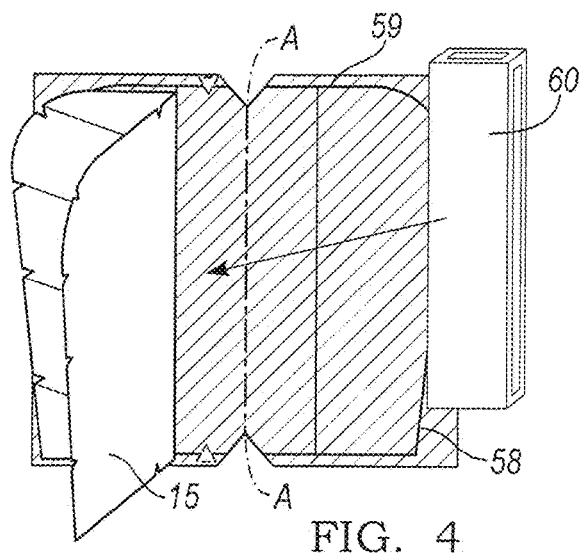
Figure 5:
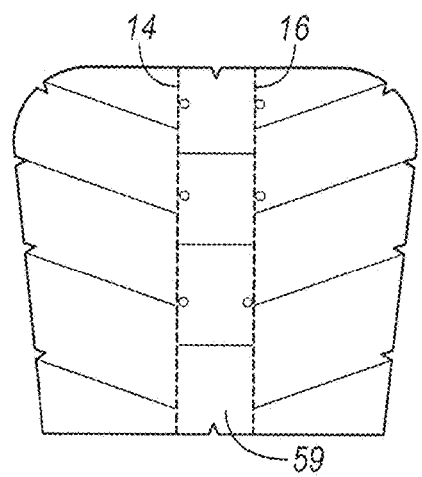
Figure 6:
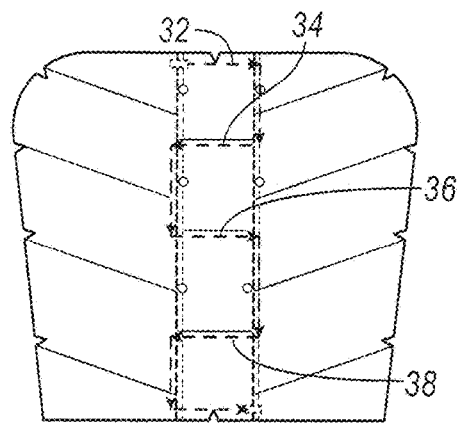

Also shown in FIG. 2 are markings 56, 58 to guide the first and second sewing lines 14, 16 (see also FIGS. 2 and 4). The line 56 corresponds to the location of the first sewing line 14, while the second line 58 corresponds to the location of the second sewing line 16.

FIGS. 3-14 typify representative steps in the assembly process that are practiced in making the seat back cushion 10. It is to be appreciated that the steps need not be practiced in the order depicted or described.

Figure 3:
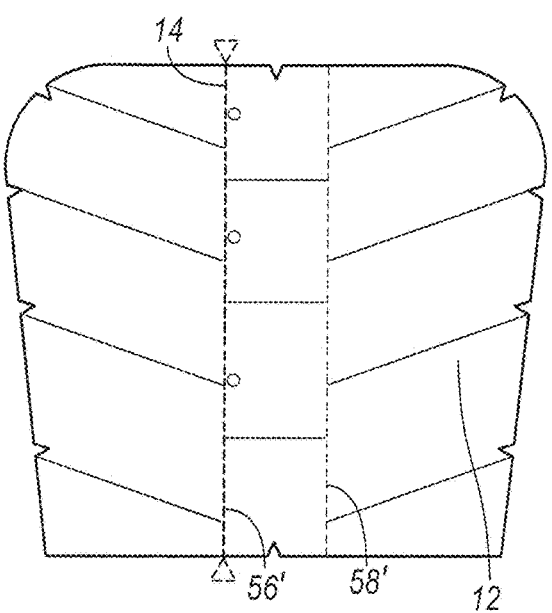
FIGS. 3-14 depict various steps in a representative manufacturing process.

One way to practice the disclosed method steps is as follows. As shown in FIG. 3, the outer material 12 is placed over the backing material 18 such that location lines 56' 58' on the material 12 are aligned with the location lines 56, 58 (not visible in FIG. 3) on the backing material 18. Then, as shown in FIGS. 3-4, the first sewing line 14 is laid, thereby securing the outer and backing materials 12, 18 to each other along a longitudinally oriented seam 14. Next, a first wadding material 60 (FIG. 4) is juxtaposed with the first sewing line 14. Then a second sewing line 16 (FIG. 5) is laid. Sewing the two pieces of material 12, 18 to each other using the first and second sewing lines 14, 16 creates a longitudinally oriented central interior space 59 between the outer and backing materials 12, 18 and between the first and second sewing lines 14, 16. The interior space 59 encapsulates the first wadding material 60 in a longitudinally extending central portion of the seat back cushion 10.

In one variant, the assembly method continues (FIG. 6) with a step of making zig-zag, tiered sewing lines 32-38 between the first 14 and second 16 sewing lines. The tiered sewing lines 32 38 commence at one edge, such as a top edge 44 and run centrally as shown in a zig-zag fashion to the opposite edge, such as the bottom edge 40, or vice-versa. In this way, a central portion of the first wadding material 60 is secured in a decorative and functional manner. In more illustrative detail, the zig-zag or tiered longitudinal sewing lines 32-58 include a lateral segment and a longitudinal segment. The latitudinal segment has a left end and a right end, and the longitudinal segment has a top end and a bottom end. The right end is serially connected to the top end and the bottom end is connected to the right end of a next segment and so on. It will be appreciated that the longitudinal or the lateral segments of the tiered sensing lines 32-38 may be invisible to the ordinary observer of a finished seat.

Figure 8:
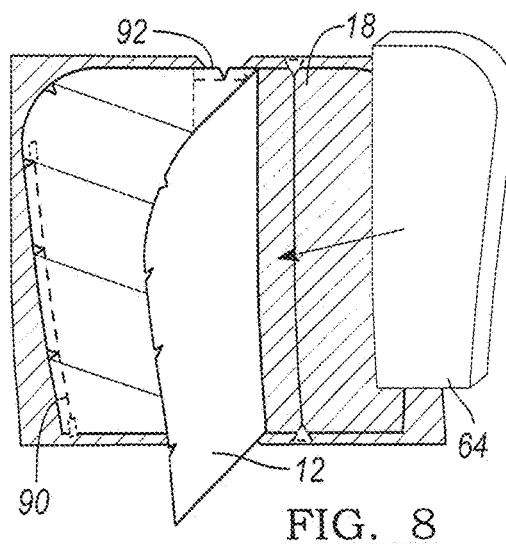

Assembly of the vehicle seat back cushion 10 continues (FIG. 7) when a second volume of wadding material 62 is placed on the left hand side of the sewing line 14. A third wadding material 64 is placed on the right hand side of sewing line 16 (FIG. 8). As with the first wadding material described herein, the second and third wadding material may include at least one of a urethane foam or a bio-based foam, such as foam created from a soy polyol, although other types of wadding material may be used as desired. One or more peripheral seams 90 secure the pad 64 at a side edge of the backing material 18 (FIG. 9).

Figure 9:
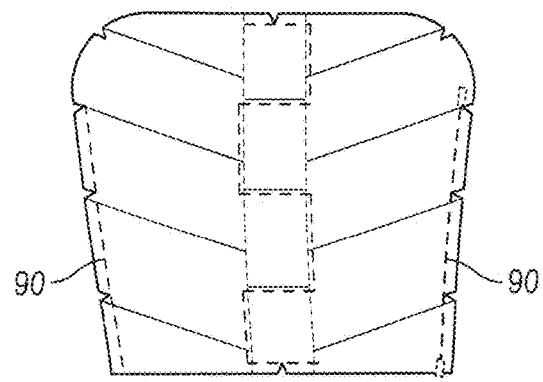
Figure 10:
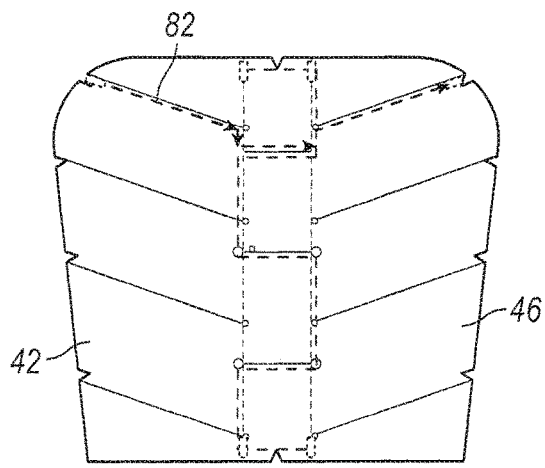
Figure 11:
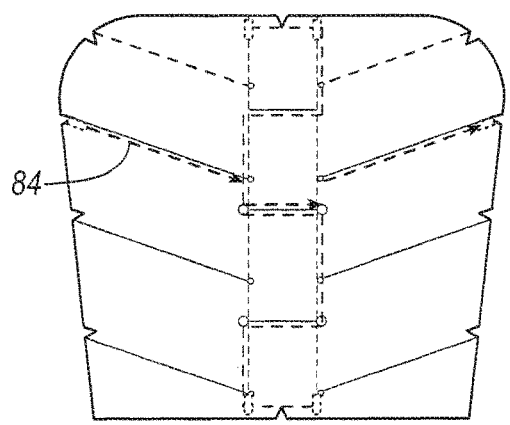
Figure 12:
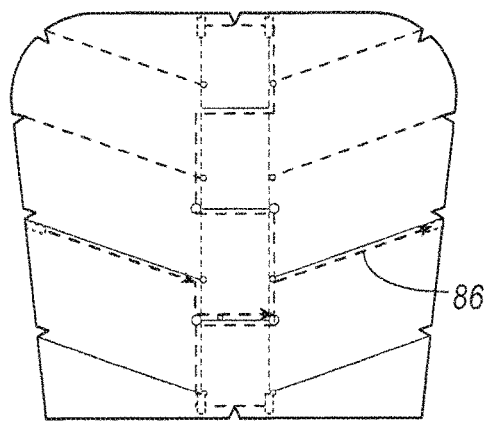
Figure 13:
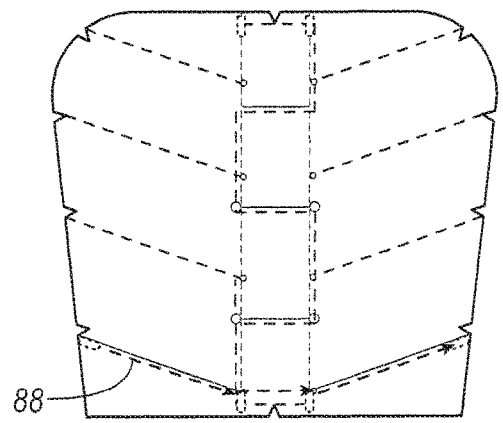
Figure 14:
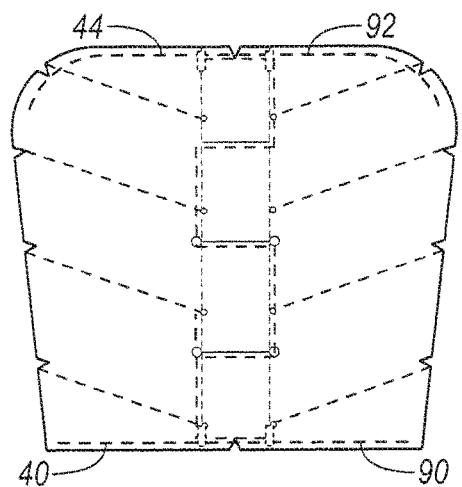

If desired, a glazing can be applied to an underside of the outer material (FIG. 9).

As shown in FIGS. 10-13, a plurality of laterally oriented seams 82-88 are sewn between the side edges 42, 46 of the seat back cushion 10. Although depicted as running in an inclined manner in the off-center region, the sewing lines 82-88 may optionally be oriented so that they run generally horizontally. It will be appreciated that the laterally oriented sewing lines 82-88 are generally perpendicular to the first and second sewing lines 14, 16. The sewing lines 82-88 include a left stitch segment that runs across a left portion of the outer material 12, a middle segment that runs across a center portion of the outer material 12 and a right segment that runs across a right portion of the outer material 12. In this context "generally" means within about 30 degrees of a horizontal axis.

Final steps (FIG. 14) involve sewing the outer 12 and backing materials 18 together using one or more additional sewing lines 90-92 respectively disposed adjacent edges 40, 44 of the wadding material 60 proximate peripheral edges of the seat back cushion 10.

Figure 15:
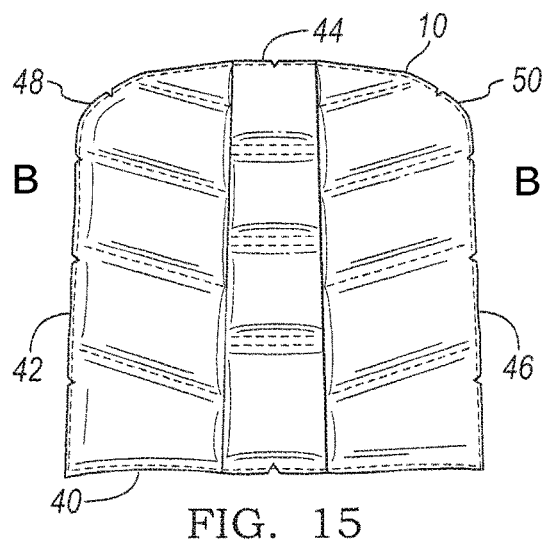
FIG. 15 is a frontal view of an illustrative seat back cushion thus manufactured with an appearance that resembles a wrist watch strap.

In some applications, the outer 12 and backing materials 18 have generally parallel longitudinal perimeters 42, 46 joined by generally parallel top and bottom edges 40, 44 that are joined by rounded corners 48, 50 (FIG. 15).

Optionally, the wadding material used herein, such as a foam pad, polyurethane (PU), polyester (PES), and/or polyether, includes foam having a thickness in an un-deflected state of about 15 mm and a density of about 33 Kg/cubic meter.

Together the outer material 12 with the laterally oriented 82-88 and longitudinally oriented 32-38 sewing lines present an appearance that is akin to a wrist watch strap.

Figure 16:
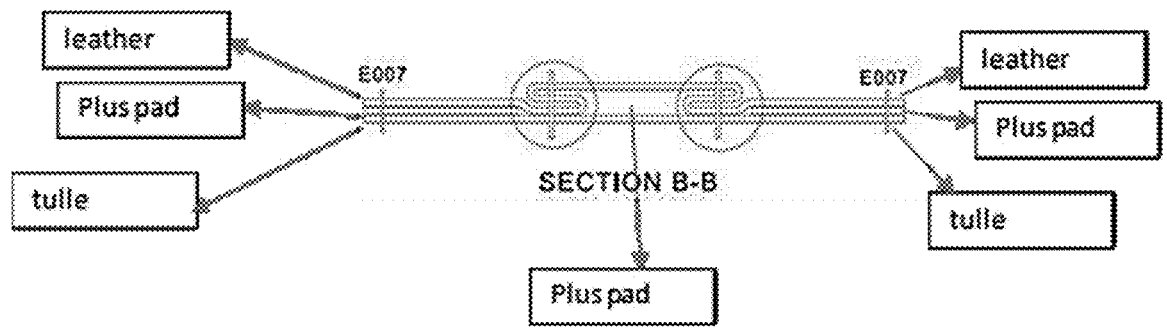
FIG. 16 is a representative cross-section taken along the line B-B of FIG. 15.

FIG. 16 is a representative cross-sectional view of one embodiment of a seat cushion assembly made by following the steps described earlier. Of note is the folded configuration of, for example, a leather seating surface that adds volume and cushioning to the seat.

It will be appreciated that the sewing process disclosed herein is offered as being illustrative. Differently sized steps or sewing orientation are also contemplated.

| Reference Number | Feature Name |
| --- | --- |
| 10 | vehicle seat assembly |
| 12 | outer material (e.g., leather) |
| 14 | first sewing line |
| 15 | underside of 12 |
| 16 | second sewing line |
| 18 | backing material (e.g., woven tulle or knit tulle or other elastic material) |
| 32-38 | longitudinally oriented sewing lines to secure 12 to 18 |
| 40-46 | linear edge segments of 12 |
| 48-50 | curved segments |
| 56 | location line of 14 |
| 58 | location line of 16 |
| 59 | interior space between 12, 18, 14 & 16 |
| 60 | wadding material into 59 |
| 62-64 | wadding material between 12 & 18 on left and right sides |
| 82-88 | laterally oriented sewing lines affixing 12 & 18 |
| 90-92 | peripheral sewing lines affixing 12 & 18 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a seat cushion for a vehicle seat assembly, the seat cushion having side edges and top and bottom edges, the method comprising:
    providing an outer material to define a surface that faces a seat occupant;
    sewing a backing material to the outer material using a linear first longitudinally oriented sewing line;
    placing a first wadding material adjacent to the linear first longitudinally oriented sewing line in a centrally located region of the backing material;
    sewing the backing material to the outer material using a linear second longitudinally oriented sewing line so that the first wadding material is secured between the linear first and second sewing lines, the first and second linear longitudinally oriented sewing lines defining therebetween a central region;
    making a tiered sewing line confined to the central region between the linear first and second sewing lines, the tiered sewing line running between the top and bottom edges;
    disposing a second wadding material between the outer and backing materials and between the linear first sewing line and an edge of the seat cushion;
    disposing a third wadding material between the outer and backing materials and between the linear second sewing line and an opposite edge of the seat cushion;
    sewing along the side, top and bottom edges of the seat cushion to further secure the first and second wadding material;
    making a plurality of laterally oriented sewing lines between the side edges of the seat back cushion; and
    sewing the outer and backing materials together using additional sewing lines respectively disposed proximate the top and bottom edges of the seat cushion.

2. The method of claim 1, wherein the laterally oriented sewing lines in the central region are generally perpendicular to the linear first and second sewing lines.

3. The method of claim 1, wherein the outer material includes leather and the backing material includes a woven tulle.

4. The method of claim 1, wherein the outer and backing materials have generally parallel longitudinal perimeters joined by generally parallel top and bottom edges that are joined by rounded corners.

5. The method of claim 1, wherein the first, second and third wadding material include a foam having constituents selected from the group consisting of a urethane material, a bio-based material and mixtures thereof.

6. The method of claim 1, wherein the first, second and third wadding material include foam having a thickness in an un-deflected state of about 15 mm and a density of about 33 Kg/cubic meter.

7. The method of claim 1, wherein the tiered sewing lines include a lateral segment and a longitudinal segment.

8. The method of claim 7, wherein a lateral segment has a left end and a right end, and a longitudinal segment has a top end and a bottom end.

9. The method of claim 8, wherein the right end of a lateral segment is connected to the top end of a longitudinal segment and the bottom end of a longitudinal segment is connected to a right end of a next segment.

10. The method of claim 1, wherein the plurality of laterally oriented sewing lines includes a left stitch segment that runs across a left portion of the outer material, a middle segment that runs across the central region of the outer material and a right stitch segment that runs across a right portion of the outer material.

11. The method of claim 10, wherein left and right stitch segments are inclined in relation to middle segments.

12. The method of claim 1, further including a step of applying a glazing on an underside of the outer material.

* * * * *